(12) United States Patent
Willinger et al.

(10) Patent No.: US 7,111,583 B2
(45) Date of Patent: *Sep. 26, 2006

(54) BIRDCAGE PERCH

(75) Inventors: Jonathan Willinger, Tenafly, NJ (US); Klaus Woltmann, Demarest, NJ (US); Ryan Rutherford, Rutherford, NJ (US)

(73) Assignee: JW Pet Company, Inc., Teterboro, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/770,987

(22) Filed: Feb. 3, 2004

(65) Prior Publication Data

US 2004/0154552 A1    Aug. 12, 2004

Related U.S. Application Data

(63) Continuation-in-part of application No. 10/365,360, filed on Feb. 12, 2003, now Pat. No. 6,684,818.

(60) Provisional application No. 60/370,200, filed on Apr. 5, 2002.

(51) Int. Cl.
 *A01K 31/06* (2006.01)
 *A01K 31/12* (2006.01)

(52) U.S. Cl. ..................... 119/468; 119/467

(58) Field of Classification Search .............. 119/468, 119/459, 467; D30/110, 124
See application file for complete search history.

(56) References Cited

U.S. PATENT DOCUMENTS

| 1,331,908 | A | * | 2/1920 | Frey | ............... | 119/468 |
|---|---|---|---|---|---|---|
| 1,951,550 | A | | 3/1934 | Little | | |
| 2,076,734 | A | | 4/1937 | Leindorf | | |
| 2,241,259 | A | | 5/1941 | Hanson | | |
| 2,570,663 | A | | 10/1951 | Guarino | | |
| 5,215,039 | A | | 6/1993 | Bescherer | | |
| 5,315,957 | A | * | 5/1994 | Garay et al. | ............... | 119/468 |
| 5,533,466 | A | * | 7/1996 | Kohus et al. | ............... | 119/459 |
| 5,588,397 | A | | 12/1996 | Johnakin, III | | |
| 6,332,431 | B1 | | 12/2001 | Brown | | |
| 6,619,236 | B1 | * | 9/2003 | Johnakin, III | ............... | 119/468 |
| 6,684,818 | B1 | * | 2/2004 | Willinger et al. | ............... | 119/468 |
| 2004/0206576 | A1 | * | 10/2004 | So | ............... | 182/179.1 |
| 2005/0056231 | A1 | * | 3/2005 | Buonocore | ............... | 119/468 |

* cited by examiner

*Primary Examiner*—Yeri Pham Luu
*Assistant Examiner*—Elizabeth Shaw
(74) *Attorney, Agent, or Firm*—Katten Muchin Rosenman LLP

(57) ABSTRACT

A lightweight perch formed from plastic, wood or the like, has, in one embodiment, an outer surface on which is applied a granular material such as sand or the like. An adhesive or solvent may be used to apply the granular material to the perch. The resultant perch duplicates the healthy, stimulative effects of expensive concrete and sand perches at a tremendously reduced weight and cost. In another embodiment, a perch is formed from a plurality of parts of dissimilar materials that are joined together through the entrainment of one material from one part into the other material from the other part.

22 Claims, 6 Drawing Sheets

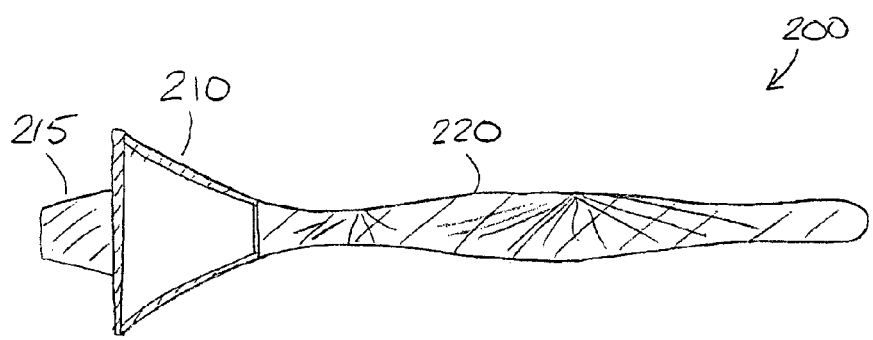
FIG 11
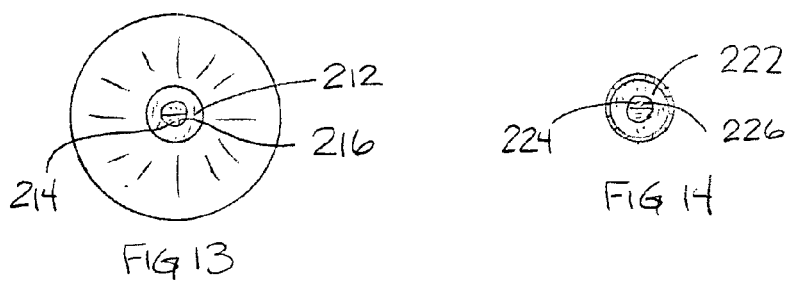
FIG 13
FIG 14
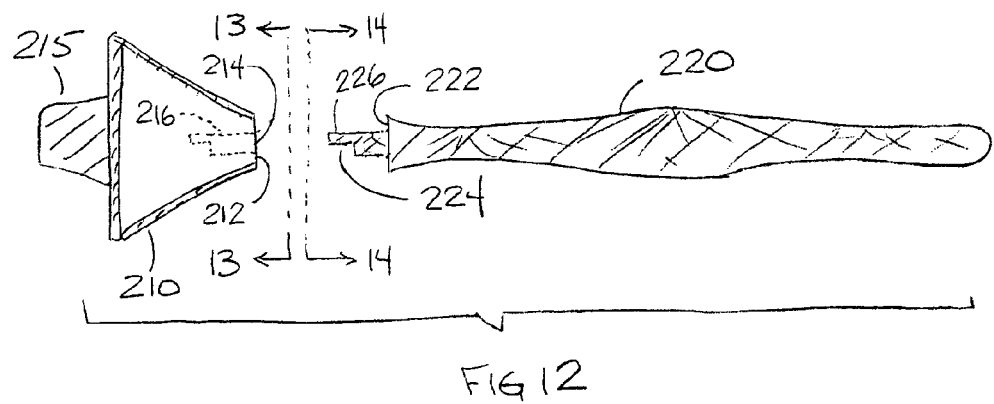
FIG 12

BIRDCAGE PERCH

CROSS-REFERENCE TO RELATED APPLICATION

This application is a continuation-in-part of U.S. application Ser. No. 10/365,360, filed Feb. 12, 2003 now U.S. Pat. No. 6,684,818, which claimed the benefit under 35 U.S.C. §119(e) from U.S. Provisional Application 60/370,200, filed Apr. 5, 2002.

FIELD OF THE INVENTION

The present invention relates to a birdcage perch, and more particularly to a lightweight, inexpensive perch having an outer surface and a layer of granular material.

BACKGROUND OF THE INVENTION

An important part of caged bird-keeping is the use of perches for pet birds to stand on. The perches simulate the branches of trees that birds stand on in the wild. There are many types of perches that have been produced in the past. These have included wooden dowels of varying lengths, actual tree branches, extruded plastic rods and injection molded plastic pieces.

There are problems with each of these prior products. The wooden dowels have little texture, which is not conducive to keeping the bird's claws healthy. The tree branches can deteriorate and are expensive to make ready for attachment to the cage. The plastic rods and molded pieces typically do not have a rough enough or deep enough texture to exercise the toes of the bird's feet. Injection molded perches are typically open on the bottom, thereby having a large open gap such that the end of the claws is not pressed against anything. Extruded rods cannot be varied in diameter, thereby leading to a lack of stimulation of the feet and claws.

It is known art to make heavy-duty perches out of material such as concrete and sand. These perches are generally heavy and expensive and sold for parrots and other expensive birds. Typically, these items consist of a centrally located metal screw that runs through the entire center of the perch. Typically, the screw would be one eighth to one quarter inch in diameter and be surrounded by a circular shaped sand or concrete cylinder such that the entire perch is one half to one inch or more in diameter. The benefit of the sand or concrete is to create a rough surface so that the bird's feet and claws can be exercised. In some of these type perches the diameter of the perch is varied from place to place to further exercise such bird's feet and claws. The problem of such solid sand and concrete perches is their weight and their expense. Typically these perches retail for a minimum of $12 and as much as $30, making them unaffordable for the typical owner of inexpensive caged birds such as parakeets (also called budgies or budgerians), finches, canaries, cockatiels and lovebirds.

SUMMARY OF THE INVENTION

A lightweight perch is formed from plastic, wood or the like and has an outer surface formed from a material that permits application of a thin layer of granular material thereon. In one embodiment, a thin layer of adhesive is applied to the outer surface of the perch, followed by a thin layer of granular material such as sand. In another embodiment, a layer of granular material is entrained in the outer surface through a temporary liquefying of the outer surface.

In yet another embodiment, a perch is formed from a plurality of parts of dissimilar materials that are joined together through the entrainment of one material from one part into the other material from the other part. The resultant perch duplicates the healthy, stimulative effects of expensive concrete and sand perches at a tremendously reduced weight and cost.

BRIEF DESCRIPTION OF THE DRAWINGS

FIG. 11 is a view of an alternative embodiment of the perch of the invention.

FIG. 12 is an exploded view of the perch of FIG. 11.

FIG. 13 is an end view taken along line 13—13 of FIG. 12.

FIG. 14 is an end view taken along line 14—14 of FIG. 12.

DETAILED DESCRIPTION OF THE PREFERRED EMBODIMENTS

Figure 1:
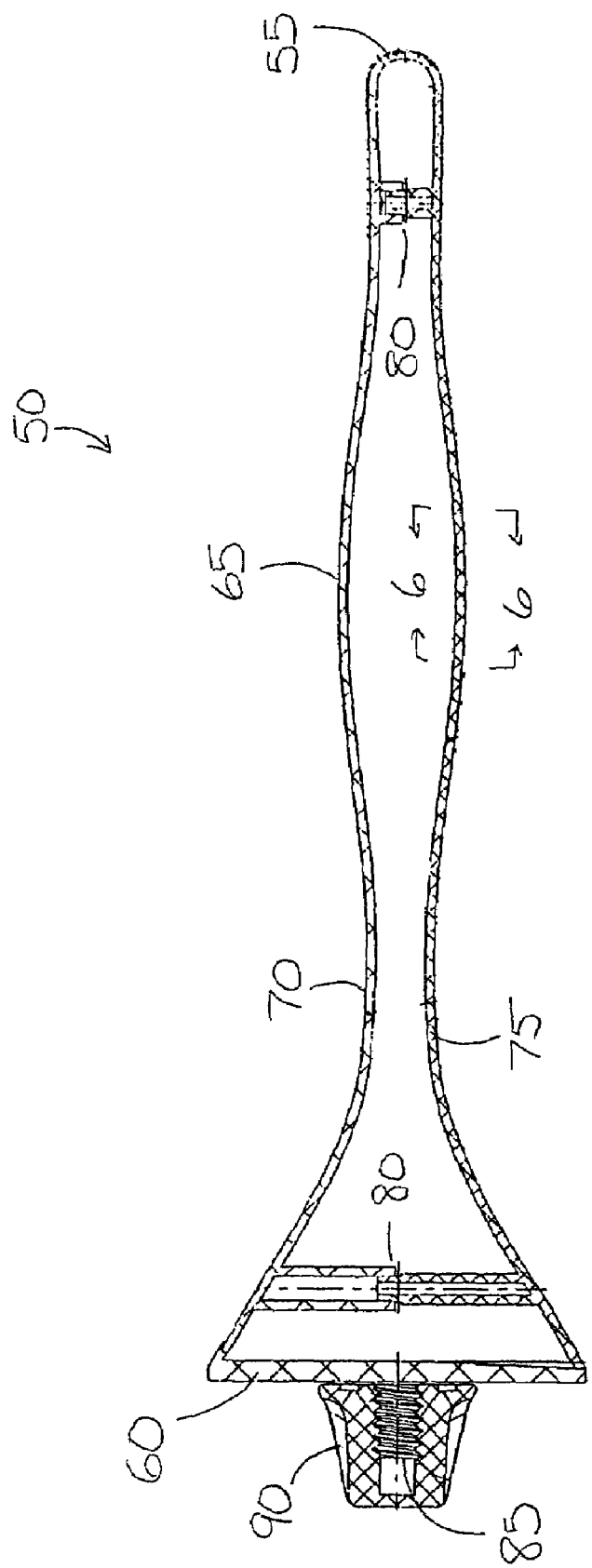
FIG. 1 is a cross section view of one embodiment of the perch of the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Figure 2:
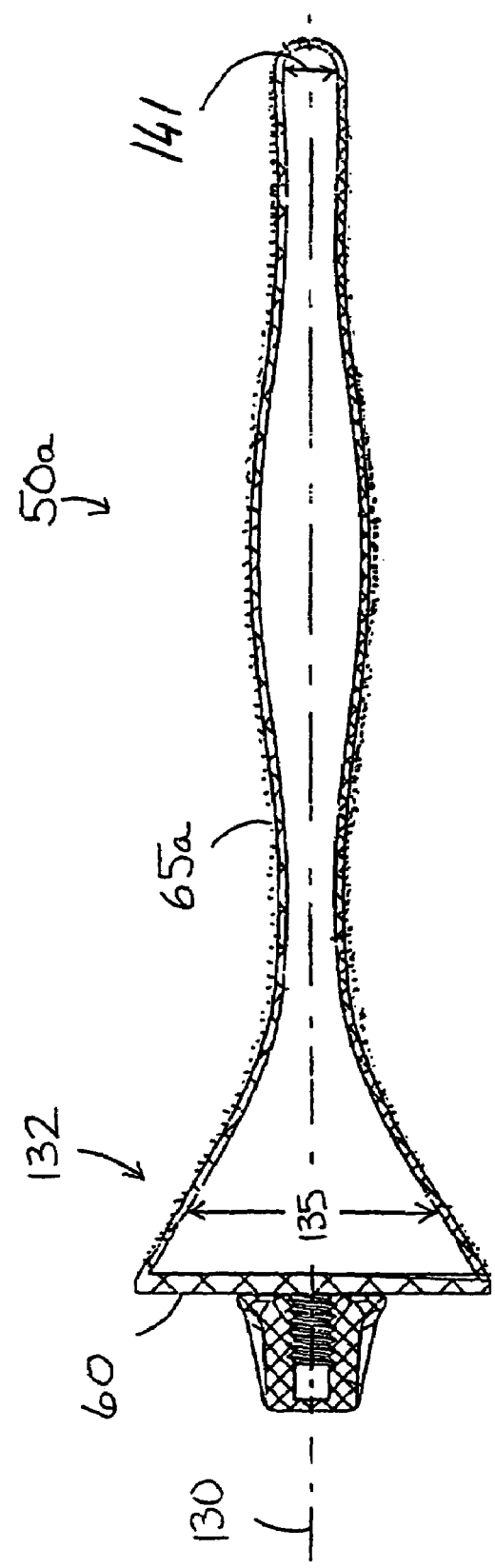
FIG. 2 is a view of an alternative embodiment of the perch of the invention.

FIG. 1 is a cross-section of one embodiment of a perch 50 of the present invention having a tip 55, a base 60 and an outer gripping surface 65. The perch 50 is hollow and formed by joining first and second halves 70, 75 via a joinder arrangement 80 or some other means. Alternatively, an outer gripping surface 65a of a perch 50a may be molded as a single piece as shown in FIG. 2.

In accordance with the perch of the present invention, a plastic perch is first manufactured. The perch 50 can be manufactured by means of an extruded rod and cutting said rod at lengths appropriate for a perch, such as lengths of six, eight, ten or twelve inches. Alternatively, a perch can be injection molded to such lengths. In either event, or if any other plastic means are used, the plastic utilized must be produced from a non-olefinic or other material that will permit the adhesion of glues or the application of solvents. Alternatively, the perch can be made from a wood dowel or other materials that will permit the adhesion of glues or the application of solvents.

Figure 3:
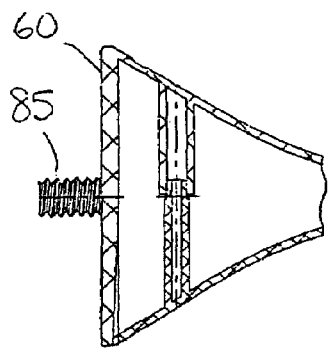
FIG. 3 is a close-up view of the fastener of the perch of the invention.
Figure 4:
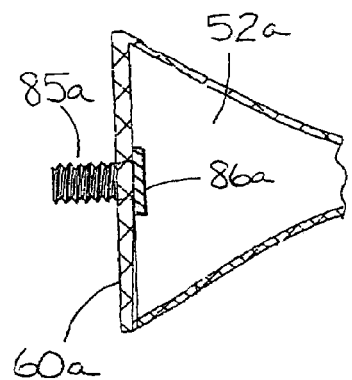
FIG. 4 is a close-up view of an alternative embodiment of the fastener.

Returning to the embodiment of FIG. 1, the two halves 70, 75 may be snapped, glued or sonically welded together. Such halves 70, 75 may be formed by injection-molding or by other means. Other joiner arrangements 80 and methods of connecting the two halves 70, 75 are surely contemplated. A fastener 85 (see also FIG. 3) such as a screw is preferably integrally formed into said base 60 either by co-molding said fastener 85 with said base 60, or by embedding the fastener 85 into said base 60. Alternatively, the fastener and base could be produced in a single mold. In either case, the fastener 85 becomes effectively irremovable from or through the base 60. Alternatively as shown in FIG. 4, a fastener 85a may be press-fit through the base 60a, such that the head 86a of the fastener 85a extends into the hollow interior 52a of the perch, again resulting in the inability to extract the fastener 85, 85a from the base 60, 60a.

Figure 5:
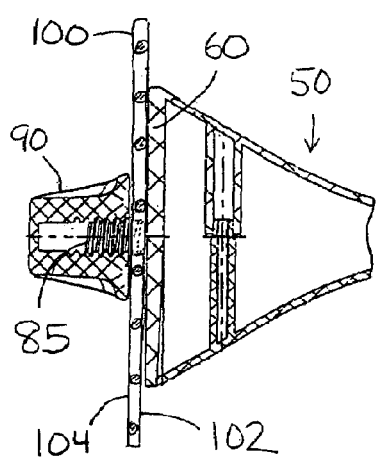
FIG. 5 illustrates the attachment of the perch to a birdcage wall.

As shown in FIG. 5, a nut or cap 90 is engageable with the fastener 85 to secure the perch 50 to a birdcage wall 100. The fastener 85 is dimensioned to extend through an opening in the birdcage wall 100 such that the perch base 60 lies adjacent an inner side 102 of the birdcage wall 100, while the cap 90 is adapted to engage said fastener 85 on an outer side 104 of the birdcage wall 100 for securely clamping said perch 50 to said birdcage wall 100.

Figure 6:
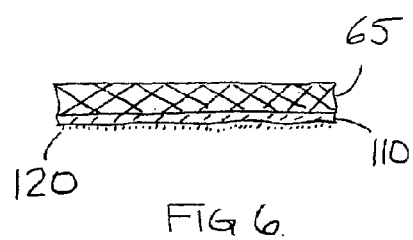
FIG. 6 is a section taken along lines 6—6 of FIG. 1.

After molding or otherwise producing a perch shaped object as discussed above, a thin layer of glue 110 (FIG. 6) or solvent 115 (FIG. 10A) is applied. Alternatively, one may be able to use lacquers and paints as an adhesive. As discussed below, a thin layer of solvent 115 such as tolulene or MEK (Methyl Ethyl Ketone) can be applied to the perch either by spraying, brushing, dipping or the like. Also, at greater expense epoxy resins can be utilized. With wood dowels other types of glues may be applied such as casein (e.g., Elmer's® glue).

Figure 7:
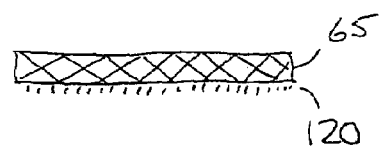
FIG. 7 is an alternative section taken along lines 6—6 of FIG. 1.

In the case of adhesive applications, after application of said layer of adhesive 110, a thin layer of granular material 120 is applied over the adhesive 110. For purposes of explanation, the granular material 120 will be described as sand, although other granular material may be used. The sand 120 may be applied by various means, such as by brush, sprinkling, spraying or dipping. If the perch is made out of plastic resin, the perch can be heated so that the outer gripping surface melts or temporarily liquefies in a manner similar to the use of solvents discussed in more detail below and the sand is applied to the outer surface without using adhesives (FIG. 7). In this case, the sand would sink into the softened plastic and then become partially embedded or entrained in the plastic surface after the plastic cools, with the goal being for the entire gripping surface 65 of the perch 50 to be covered with sand 120. Alternatively, most of the gripping surface 65, or only certain select portions of the gripping surface 65 may be covered with sand 120 as the case may be.

Figure 10A:
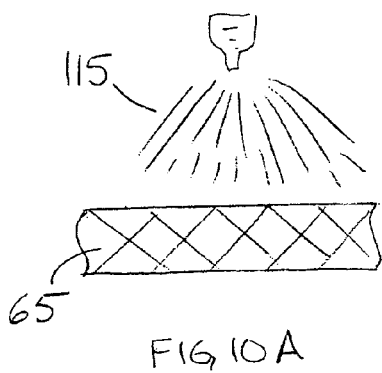
FIG. 10A illustrates the application of a solvent to the gripping surface of the perch of the invention.

In the case of solvent applications, a thin layer of solvent 115 such as tolulene or MEK (Methyl Ethyl Ketone), for example, can be applied to the gripping surface 65 either by spraying as shown in FIG. 10A, brushing, dipping or the like (not shown). A solvent is a liquid that dissolves plastic.

Figure 10B:
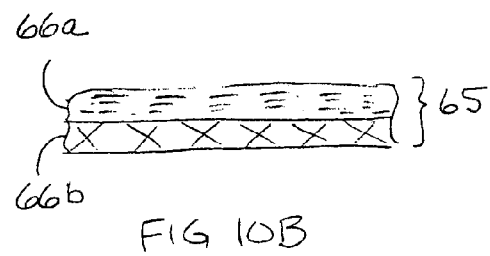
FIG. 10B illustrates a liquefied outer layer of the gripping surface of FIG. 10A.
Figure 10C:
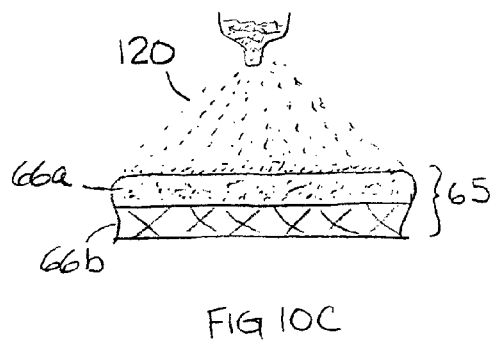
FIG. 10C illustrates the application of a granular material to the gripping surface of FIG. 10B.
Figure 10D:
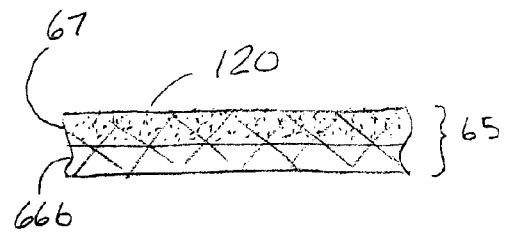
FIG. 10D illustrates the gripping surface of FIG. 10C after the liquefied outer layer has hardened.

When the solvent 115 (liquid) is applied to the plastic gripping surface 65 (solid), the gripping surface 65 is transformed as shown in FIG. 10B into a top liquefied layer 66a of plastic, which becomes a solute or a combination of the solvent 115 (liquid) and the plastic 66a (solid), and a bottom solid layer of plastic 66b that remains unchanged as a result of not being exposed to the solvent 115. Once the top layer of plastic 66a has been liquefied, sand 120 may be applied to the perch by various means, such as by brushing, sprinkling, spraying as shown in FIG. 10C or by dipping, whereby the sand 120 becomes entrained or embedded in the top layer of plastic 66a. Once the solvent evaporates and the liquefied plastic layer 66a hardens as shown in FIG. 10D, the resultant outer gripping surface is defined by a combination of a hardened plastic layer 67 having sand 120 entrained or embedded therein and the bottom layer of plastic 66b. Entrainment is the embedding of the sand 120 in the top layer 66a of the gripping surface 65, which top layer 66a temporarily softens as a result of the solvent application. Entrainment does not occur with adhesives or paints, wherein the sand would merely be affixed to the outer layer and not become a part of the outer layer through a change in the outer layer.

Figure 9:
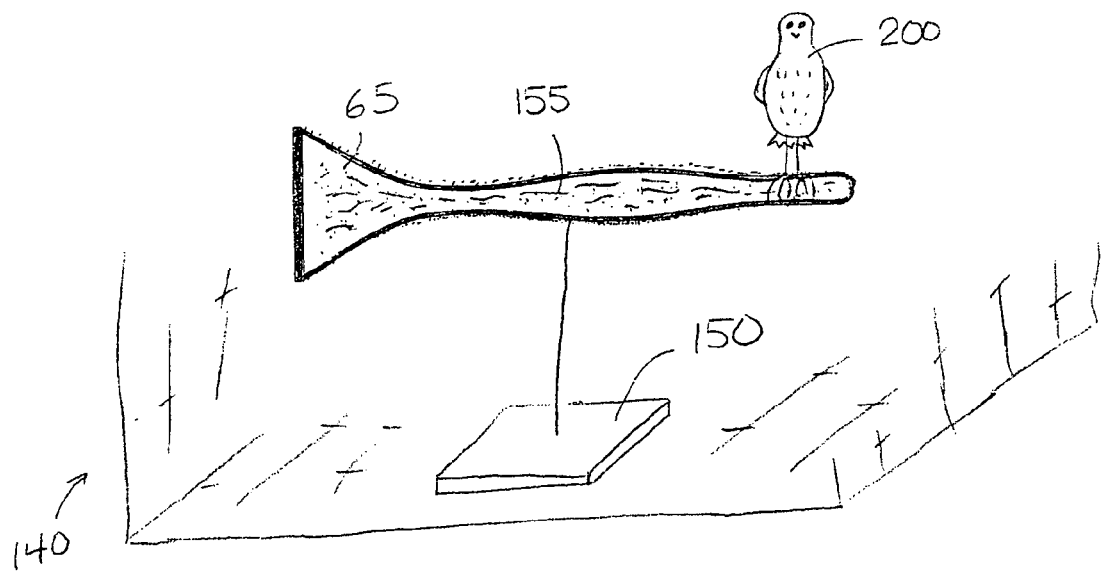
FIG. 9 illustrates a freestanding perch of the invention.

The resulting perch duplicates the healthy, stimulative effects of expensive concrete and sand perches at a tremendously reduced weight and cost. In addition to a granular coating, a further texture or contour 155 (FIG. 9) may be applied to the outer gripping surface 65 of the perch to increase the stimulative effect on the bird 200 (FIG. 9). Such further texture 155 may be fashioned into the outer gripping surface 65 during a molding operation, or it may be achieved by scoring the outer gripping surface 65 with a sharp instrument, the latter being preferred if the perch is made from wood.

The perch 50 is preferably produced in a "wavy" manner, varying the diameter of the perch at various points along its longitudinal axis 130 (FIG. 2) in order to facilitate variation of the tension on the part of the bird's feet. The perch 50 is also preferably produced or molded as a hollow structure and with the outer gripping surface extending completely around the longitudinal axis 130 (i.e., presenting a continuous surface as opposed to being open on the bottom as known in the art). The diameter 141 at the perch tip is small as compared with the diameter 135 near the base 60. A "flared out" portion 132 is provided with a steeply increasing diameter 135 that increases towards the base 60 and the point of attachment to the cage wall (FIG. 5). This portion 132 discourages the bird 200 (FIG. 9) from sitting very close to the cage wall and helps prevent feces from dropping on the bars of the cage (see FIG. 5) and the inside walls of the bottom tray, which also facilitates cleaning of the cage.

Figure 8:
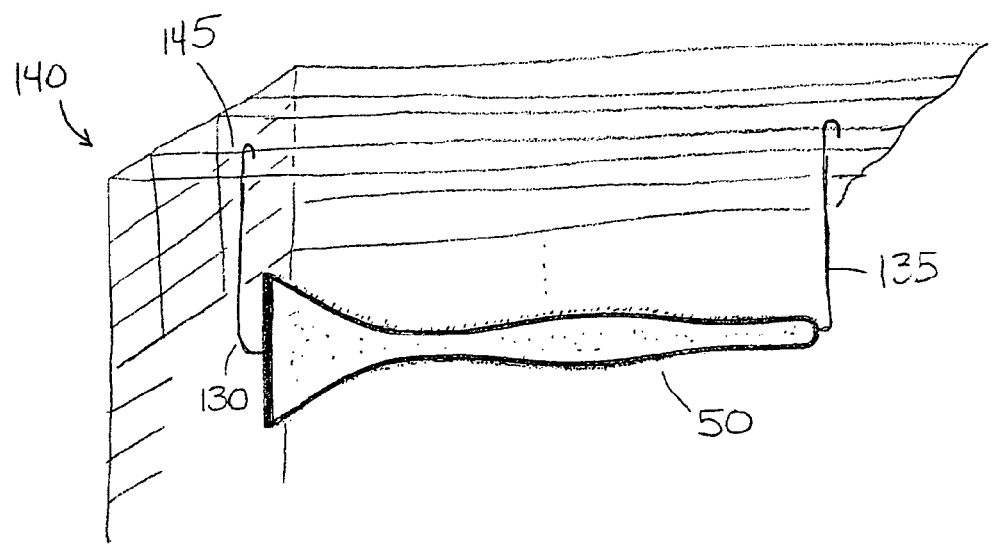
FIG. 8 illustrates a perch of the invention formed into a swing.

The perch of the present invention may be supported on a cage as shown in FIG. 5, or the perch may be made into a swing (FIG. 8) or be made freestanding (FIG. 9). If the perch is formed into a swing, wires 130, 135 could be inserted into the base and tip for attachment to the top 145 of the cage 140 as shown. Other attachment means are contemplated. For example, the perch could be attached between opposite ends of a cage (not shown), wherein it spans the length or width of the cage, or it could be attached on a diagonal (not shown) using simple slotted cutouts on each end of the perch that engage the cage wires. The perch 155 can also be attached to a device 155 such as a platform or the like, which sits at the bottom of the cage 140 or is attached thereto (FIG. 9).

Figure 15:
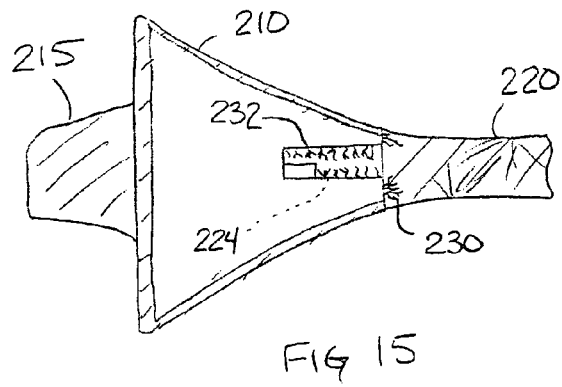
FIG. 15 illustrates joinder of the perch sections of FIG. 12 through entrainment.

As noted above, alternatively, the perch can be made from a wood dowel or other materials that will permit the adhesion of glues or the application of solvents. FIGS. 11–15 illustrate an alternative embodiment of a perch 200 of the present invention formed from preferably two dissimilar materials that are joined together using a solvent. Specifically, a plastic base 210 having attachment means 215 as discussed above is fixedly and securely joined to a wooden gripping surface 220 through entrainment of plastic base 210 into the wood fibers of the gripping surface 220. Plastic base 210 is provided with a mating surface 212 and a mating opening 214 that are initially exposed to a solvent through spraying, brushing or the like, to soften or liquefy the outer layers of such surface 212 and opening walls 214 as discussed in connection with FIGS. 10A and 10B. Wooden gripping surface 220 having a mating surface 222 and a cylindrical boss 224 is then joined to the plastic base 210 by inserting the boss 224 into the mating opening 214 until contact results between mating surfaces 212, 222 and between the boss 224 and the walls 216 of the opening 214. The boss 224 may be provided with an extension 226 that prevents rotation of the boss 224, and therefore the gripping surface 220, with the base 210 upon joinder of the base 210 with the grip 220. The solvent-induced liquefied plastic outer layer along the mating surface 212 and inner wall 216 of the opening 214 then become entrained in the wood fibers of the mating surface 222 and boss 224 as illustrated in FIG. 15 by the wavy lines 230 and 232 representing liquefied plastic. Once the solvent evaporates and the liquefied plastic that has seeped into the wooden gripping surface 220 hardens back to its non-liquefied state, the wooden gripping surface 220 becomes bonded to the base 210 and becomes very difficult, if not impossible to separate from the base 210. While the connection between the base 210 and gripping surface 220 could be accomplished without the boss 224, the boss provides an additional entrainment surface for bonding the plastic with the wood, while the extension 226 prevents the relative rotation of the base 210 with the gripping surface 220. The wooden gripping surface 220 can then be adhesively coated with sand or further textured as discussed in connection the embodiments of FIGS. 1–9.

Of course, while the embodiment of FIGS. 11–15 includes a plastic base 210 and a wooden gripping surface 220, the opposite could occur whereby the base could be wooden and the gripping surface could be plastic, or the base and gripping surface could be formed from other dissimilar materials as the case may be. For instance, it may be more economical in certain cases to have a perch that is formed mostly of plastic, whereby the base could be formed from wood and the gripping surface could be formed from plastic. Alternatively, the base could be formed from another material that would allow the plastic gripping surface to become entrained therein. While the choice of materials is not critical, it should be appreciated that the perch of the current embodiment will be operable as long as one material is capable of becoming entrained within the other.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

We claim:

1. A method of forming a birdcage perch comprising the steps of:
    a) providing a perch having a wavelike shape and a base having a cross-sectional perimeter larger than other portions of the body; and having a plastic outer gripping surface,
    b) applying a solvent to an outer layer of said plastic outer gripping surface, and
    c) applying a granular material to said outer layer to form a granular-laden outer gripping surface.

2. A method in accordance with claim 1, wherein said solvent further comprises one of tolulene and methyl ethyl ketone.

3. A method of forming a birdcage perch comprising the steps of:
    a) providing a perch having a wavelike shape and a base having a cross-sectional perimeter larger than other portions of the body and having an outer gripping surface,
    b) softening an outer layer of said outer gripping surface,
    c) applying a granular material to said softened outer layer, and
    d) allowing said softened outer layer to harden to form a hardened outer layer having said granular material embedded therein.

4. A method in accordance with claim 3, wherein said softening step further comprises the step of heating said outer gripping surface to melt said outer layer.

5. A method in accordance with claim 3, wherein said outer gripping surface is plastic and wherein said softening step further comprises the step of applying a solvent to said outer gripping surface to liquefy said outer layer.

6. A method in accordance with claim 5, wherein said solvent further comprises one of tolulene and methyl ethyl ketone.

7. A lightweight perch suitable for gripping by a bird and attaching to a birdcage, the birdcage perch comprising:
    a body having a wavelike shape and a base having a cross-sectional perimeter larger than other portions of the body;
    an outer gripping surface; and
    a granular material entrained within an outer layer of said outer gripping surface and a solvent layer.

8. A lightweight perch in accordance with claim 7, further comprising means for attaching the perch to a birdcage, said attaching means being integrally formed with said base.

9. A lightweight perch in accordance with claim 7, wherein said outer surface of said perch softens and becomes adapted to receive and retain said granular material applied thereto without the use of adhesives.

10. A lightweight perch in accordance with claim 9, wherein said outer surface of said perch softens when heated and becomes adapted to receive and retain said granular material applied thereto without the use of adhesives.

11. A lightweight perch in accordance with claim 9, wherein said outer surface of said perch softens when exposed to a solvent and becomes adapted to receive and retain said granular material applied thereto without the use of adhesives.

12. A birdcage perch comprising:
    a) a base formed from a first material and adapted for attachment to a birdcage, and b) a gripping surface formed from a second material and an added solvent and adapted for supporting a bird thereon, c) wherein said base and gripping surface are joined through the entrainment of one of said first and second materials into the other of said first and second materials.

13. A birdcage perch in accordance with claim 12, wherein the first material is plastic and the second material is wood.

14. A birdcage perch in accordance with claim 13, wherein the plastic becomes entrained in the wood through the application of a solvent to the plastic prior to joining said base with said gripping surface.

15. A birdcage perch in accordance with claim 12, further comprising means for preventing rotation of said base relative to said gripping surface.

16. A birdcage perch in accordance with claim 15, wherein said rotation-preventing means further comprises a boss that mates with an opening in the base during joinder of the base with the gripping surface.

17. A method of forming a birdcage perch comprising the steps of:

a) forming a base from a first material, said base having a mating surface and further adapted for attachment to a birdcage, b) forming a gripping surface from a second material and an added solvent, said gripping surface having a mating surface and further adapted for supporting a bird thereon, and c) joining said base with said gripping surface along their respective mating surfaces through the entrainment of one of said first and second materials into the other of said first and second materials.

18. A method in accordance with claim 17, wherein said entrainment is preceded by the step of liquefying one of said mating surfaces prior to joinder of said base with said gripping surface.

19. A method in accordance with claim 18, wherein said liquefying occurs by applying a solvent to said one of said mating surfaces.

20. A method in accordance with claim 19, wherein said base is formed from plastic and said gripping surface is formed from wood and said plastic becomes entrained in said wood.

21. A lightweight perch suitable for gripping by a bird and attaching to a birdcage comprising:

an outer gripping surface;

a granular material entrained within an outer layer of said outer gripping surface and an solvent layer; and a base and means for attaching the perch to a birdcage, said attaching means being integrally formed with said base.

22. A method of forming a birdcage perch comprising the steps of:

a) providing a cantilievered perch having a wavelike shape and; and having a plastic outer gripping surface, b) applying a solvent to an outer layer of said plastic outer gripping surface, and c) applying a granular material to said outer layer to form a granular-laden outer gripping surface.

* * * * *